(12) United States Patent
Breitenstein et al.

(10) Patent No.: US 7,162,062 B2
(45) Date of Patent: Jan. 9, 2007

(54) METHOD OF PROCESSING IMAGES

(75) Inventors: Jacques Breitenstein, Saint-Maur-des-Fosses (FR); Raoul Florent, Ville d'Avray (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 437 days.

(21) Appl. No.: 10/028,388

(22) Filed: Dec. 21, 2001

(65) Prior Publication Data
US 2002/0114499 A1   Aug. 22, 2002

(30) Foreign Application Priority Data
Dec. 26, 2000   (FR)   ................................. 00 17044

(51) Int. Cl.
*G06K 9/46*       (2006.01)
*G06T 7/60*       (2006.01)

(52) U.S. Cl. ........................ 382/128; 382/197; 382/260

(58) Field of Classification Search ................ 382/128, 382/130, 132, 154, 180, 197, 199, 202, 204, 382/256, 257, 258, 259, 260
See application file for complete search history.

(56) References Cited

U.S. PATENT DOCUMENTS

| | | | |
|---|---|---|---|
| 5,668,893 A * | 9/1997 | Kanda et al. ................ | 382/197 |
| 5,809,105 A | 9/1998 | Roehm et al. ............ | 378/98.12 |
| 5,859,929 A * | 1/1999 | Zhou et al. .................. | 382/175 |
| 6,047,090 A * | 4/2000 | Makram-Ebeid ............ | 382/257 |

FOREIGN PATENT DOCUMENTS

EP         0 880 108 A1 * 11/1998
WO     WO 94/19759 A1 *  9/1994

OTHER PUBLICATIONS

Djezieri et al., "Extraction of Signatures from Check Background Based on a Filiformity Criterion," *IEEE Transactions on Image Processing*, vol. 7, No. 10, Oct. 1998, pp. 1425-1438.*

* cited by examiner

*Primary Examiner*—Andrew W. Johns

(57) ABSTRACT

A method of processing images in images comprising curvilinear structures comprises, in parallel, a step of filtering said images and a decision step intended to select the pixels of the images pertaining to a curvilinear structure, the method comprising, in parallel, a sub-step of estimating the direction of each image pixel, as well as a sub-step of analyzing the connectivity of neighboring pixels based on their directions at the end of the sub-step of estimating the direction of each image pixel, and a sub-step of selecting groups of pixels as a function of the result of the sub-step of analyzing the connectivity of neighboring pixels based on their directions, at the end of the step of filtering. Such a method allows selection of curvilinear structures which are fine structures such as a catheter in a medical image, or thicker structures such as a tree-like structure of blood vessels. This method may be used, for example, in medical scanning apparatus for detecting artery anomalies such as stenosis or a diffuse coronary disease.

11 Claims, 7 Drawing Sheets

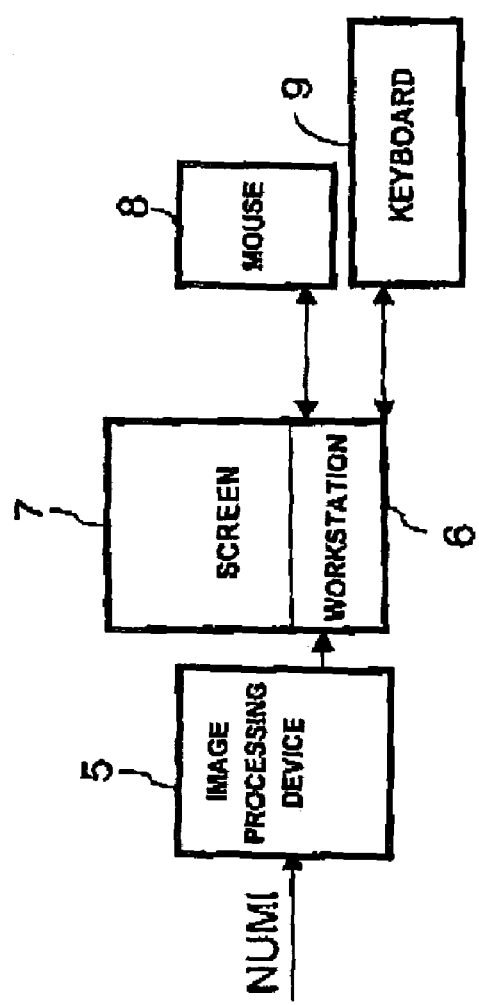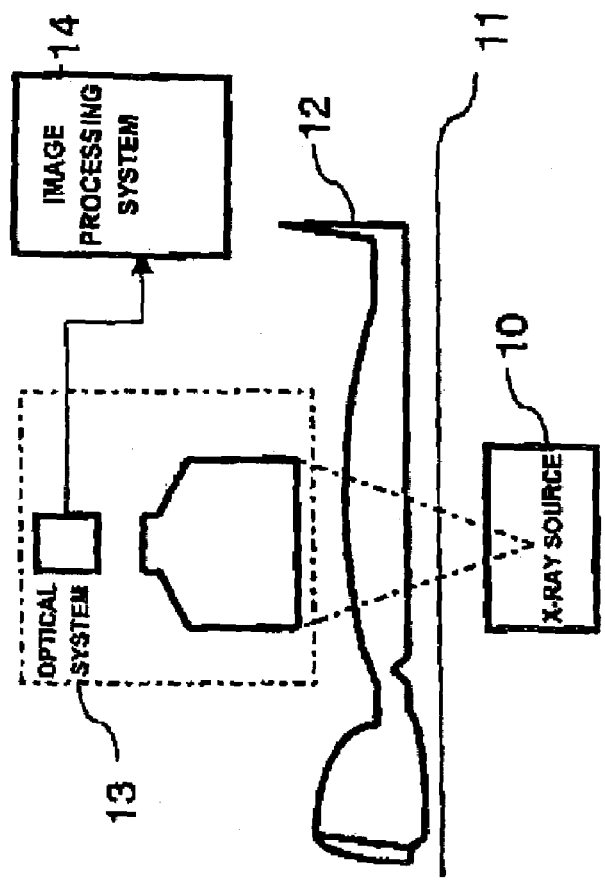

METHOD OF PROCESSING IMAGES

FIELD OF THE INVENTION

The invention relates to a method of processing images in images comprising curvilinear structures, the method comprising, in parallel, a step of filtering said images and a decision step intended to select the pixels of the images pertaining to an interesting curvilinear structure. The invention also relates to a computer program intended to perform this method, as well as to a medical scanning apparatus comprising an image acquisition device and a system for processing these images in accordance with said method. The invention may be used, for example, in the field of medical scanning.

DESCRIPTION OF THE PRIOR ART

Numerous images comprise interesting curvilinear structures. This is the case in medical images, where these interesting curvilinear structures may be blood vessels or a catheter. The typical diameter of a catheter varies between 1 and 3 pixels and the typical diameter of a blood vessel varies between 5 and 20 pixels.

A system for processing images in a sequence of images acquired by way of X-ray fluoroscopy is described in U.S. Pat. No. 5,809,105. This system comprises a digital image acquisition device, a filtering device using a Gaussian filter intended to eliminate the noise caused by the random fluctuations of the electric signal during acquisition of the sequence of images, and a detection device intended to distinguish the pixels pertaining to an interesting structure from pixels pertaining to the basic image. This detection device is based on a method of detecting edges, using the gradient and does not allow a good selection of the interesting curvilinear structures which are generally difficult to distinguish in a fluoroscopy image because the X-rays used have a low power and the image is thus very noisy.

SUMMARY OF THE INVENTION

It is a first object of the invention to provide a method allowing improvement of the selection of interesting curvilinear structures in images.

According to the invention, a method of processing images as defined in the opening paragraph has the following characteristic features. The decision step comprises, in parallel, a sub-step of estimating the direction of each image pixel, as well as a sub-step of analyzing the connectivity of neighboring pixels based on their directions at the end of the sub-step of estimating the direction of each image pixel, and a sub-step of selecting groups of pixels as a function of the result of the sub-step of analyzing the connectivity of neighboring pixels based on their directions, at the end of the step of filtering.

An advantage of this method is that it allows elimination of false alarms while preserving the interesting curvilinear structures. This method is robust and yields stable results in numerous types of images. Another advantage of this method is that it allows selection of thick curvilinear structures, which is interesting in medical scanning where certain structures such as blood vessels are thick curvilinear structures.

It is a second object of the invention to provide a computer program and an image-processing system for performing this method.

It is a third object of the invention to provide a medical scanning apparatus comprising an image acquisition device and a device for performing said method.

The invention takes the following aspects into consideration. The selection of interesting curvilinear structures in images is often difficult. This is the case in medical images which may be acquired, for example, by way of X-ray fluoroscopy or by way of magnetic resonance.

The following principle allows improvement of the selection of interesting curvilinear structures in an image. A digital image constituted by a table of values corresponding to the grey levels of each pixel is filtered by means of a filter whose role is to select a large part of the curvilinear structures in the image. The nature of the filter is not critical since it fulfills this role. This filter may also form a threshold of the filtered image in order to effect a first selection of the pixels for the purpose of reducing the number of pixels to be treated in the following steps. This filtering operation simultaneously plays the role of the filtering device and of the detection device described with reference to the prior art.

Parallel to this filtering operation, the direction is estimated for each pixel of the digital image. For example, one may measure the tangential direction of a pixel. Indeed, the neighboring pixels pertaining to the same curvilinear structure will have neighboring tangential directions. A direction image comprising, for each pixel, an angular sector number corresponding to its direction can be obtained by this estimation of the direction of each pixel. An analysis of the connectivity of neighboring pixels based on their directions is realized on the direction image, thanks to the angular sector numbers contained in this direction image. The object of this connectivity analysis of neighboring pixels is to obtain a connected image in which the neighboring pixels having apneighboring numbers of the angular sector are interconnected. Subsequently, groups of pixels are selected on the basis of this connected image for the filtered image in order to eliminate or preserve certain groups of pixels as a function of an adjustable parameter. As regards edge detection based on a gradient method, the method described in the invention allows a finer selection of groups of pixels pertaining to an interesting structure and thus elimination of a large number of false alarms. Indeed, while a gradient method allows selection of all the pixels of an image presenting a certain contrast with their nearest neighbors without taking further remote neighbors into account, the method described in the invention allows further remote neighbors to be taken into account, which is important for the detection of curvilinear structures which generally extend through a length of several tens of pixels.

An image is thus obtained in which the interesting curvilinear structures are selected. It is important to note that the structures which are interesting in an image will not always be the same according to the application. For example, in a medical image representing a tree structure of blood vessels, the operator may be interested in selecting the catheter having a diameter which is smaller than that of the main vessels. The fact that adjustable parameters are used, possibly by the operator, allows selection of curvilinear structures of different thicknesses in accordance with the application under consideration.

The invention and additional characteristic features which may be used to advantage for carrying the invention into effect will be described in greater detail below with reference to diagrammatic Figures.

BRIEF DESCRIPTION OF THE DRAWINGS

FIGS. 5a and 5b are block diagrams illustrating an image-processing system and a medical scanning apparatus for carrying out the invention.

DESCRIPTION OF PREFERRED EMBODIMENTS

Figure 1:
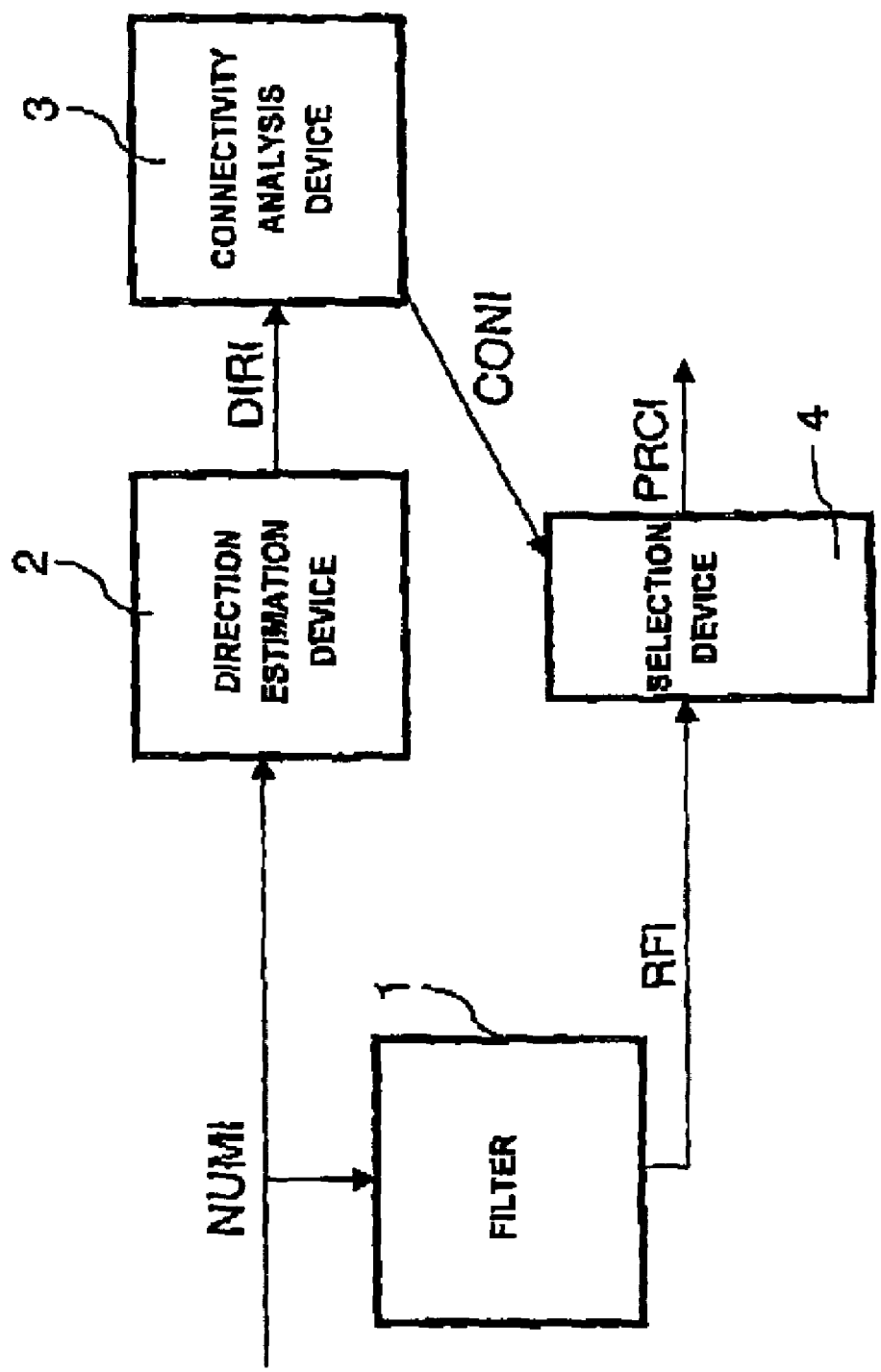
FIG. 1 is a diagram illustrating the characteristic features of the invention.

FIG. 1 is a block diagram illustrating the characteristic features of the invention. A method of processing images comprises a step of filtering realized by a filter 1, a sub-step of estimating the direction of each pixel of the image, realized by a direction estimation device 2, a sub-step of analyzing the connectivity of neighboring pixels, realized by a connectivity analysis device 3 and a sub-step of selecting groups of pixels, realized by a selection device 4.

A digitized image NUMI is applied to the filter 1. A filtered image RFI is obtained in which a large part of the curvilinear structures of the digitized image NUMI is selected. In parallel, the digitized image NUMI is applied to the direction estimation device 2. A direction image DIRI is obtained, which comprises a set of angular sector numbers corresponding to the directions of all the pixels of the digitized image NUMI. The connectivity analysis device 3 has the direction image DIRI as input. The operation of this connectivity analysis device 3 will be described in greater detail with reference to FIG. 3. This connectivity analysis device 3 allows a connected image CONI to be obtained in which the pixels of the direction image DIRI are connected or not connected as a function of their angular sector numbers. The filtered image RFI is subsequently applied to the selection device 4, which allows a selection of the pixels of the filtered image RFI pertaining to an interesting curvilinear structure, as a function of the connected image CONI. A processed image PRCI is thus obtained.

Figure 2:
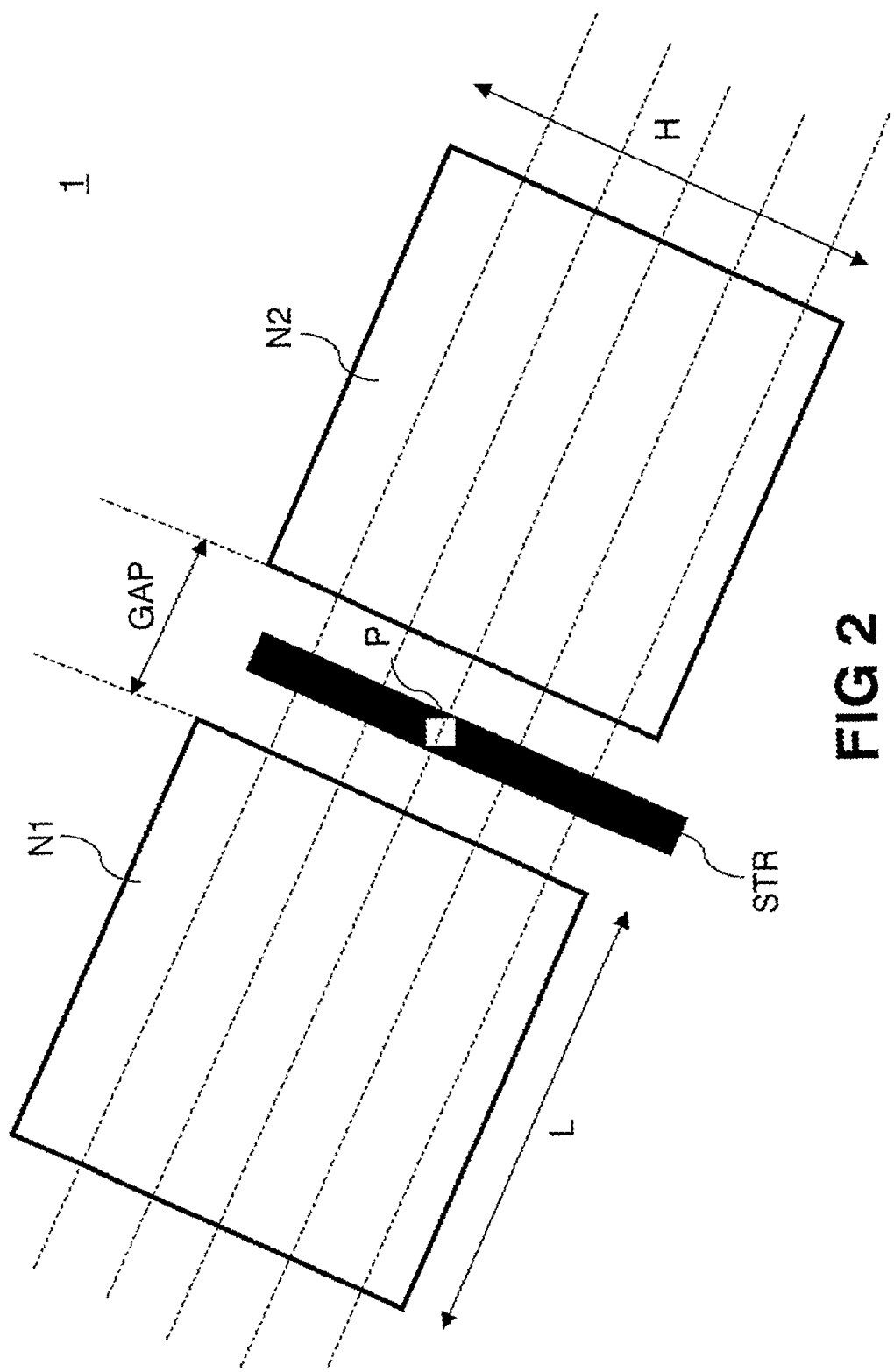
FIG. 2 illustrates an example of a filter for selecting curvilinear structures in an image.

FIG. 2 illustrates an example of the filter 1 for selecting the curvilinear structures in an image. In the example illustrated in this Figure, the filter 1 is used for a pixel P of the image NUMI pertaining to a curvilinear structure STR. It should be noted that the filter 1 is used in the same way for all the pixels of the image NUMI. Moreover, in the description of FIGS. 2 to 4, the curvilinear structures which one wishes to select are dark with respect to the background of the image. A first neighborhood N1 having a height H and a length L is considered on one side of the pixel P. A second neighborhood N2 of the same dimensions is considered to be on the other side of the pixel P. The width between these neighborhoods N1 and N2 is determined by virtue of the adjustable parameters H and L. The gap GAP between the first neighborhood N1 and the second neighborhood N2, i.e. the number of pixels between these 2 neighborhoods is chosen as a function of the width of the curvilinear structures STR which one wishes to select. The larger the thickness of the curvilinear structures STR which one wishes to select, the wider the gap GAP between the two neighborhoods N1 and N2. For example, if curvilinear structures STR having an average thickness of one pixel are to be selected, which would be the case with a catheter in a medical image, a gap GAP of the order of two or three pixels between the two neighborhoods N1 and N2 would be chosen. If curvilinear structures STR of an average thickness of between 10 and 20 pixels are to be selected, which would be the case with a tree structure of blood vessels in a medical image, a gap GAP of the order of 20 pixels between the two neighborhoods N1 and N2 would be chosen. The principle of this filter 1 is as follows. The sum $\Sigma_u$ of the grey levels of all the pixels situated above and below the pixel P is found for the height H in the structure STR. For each row of pixels having a length L pertaining to the neighborhood N1, symbolized by dotted lines, the average $M_{11}$ is computed for the grey levels of all the pixels of the neighborhood N1 present in this row. For each row of pixels having a length L pertaining to the neighborhood N2, symbolized by dotted lines, the average $M_{12}$ is computed for the grey levels of all the pixels of the neighborhood N2 present in this row. The minimum $\min_1$ of $M_{11}$ and $M_{12}$ is computed. The sum $\Sigma_v$ of all the minima mint of the rows of pixels of the length L is formed for the height H. Finally, the difference C between $\Sigma_u$ and $\Sigma_v$ is computed in order to obtain the contrast at the pixel P. This operation is performed for all the pixels of the image NUMI and the image RFI is obtained in which the value of each pixel is equal to the contrast C.

The advantage of this filter 1 is that it allows selection of curvilinear structures having selected thicknesses and thus elimination of thicker structures. For example, in medical scanning, this filter allows selection of a tree structure of blood vessels and attenuation of thicker structures such as a blood clot.

Moreover, this filter can perform a first permissive selection of pixels of the digitized image NUMI pertaining to an interesting curvilinear structure, in accordance with a criterion using an adjustable parameter X. For example, the selected pixels are those having a value which is higher than X times the variance of noise in the image filtered by the above-described device. The parameter X may be chosen to be more or less important in accordance with the desired selection degree. The role of this first selection is to limit the number of pixels taken into account in the subsequent steps so as to avoid problems of overloading the memory cell.

Figure 3A:
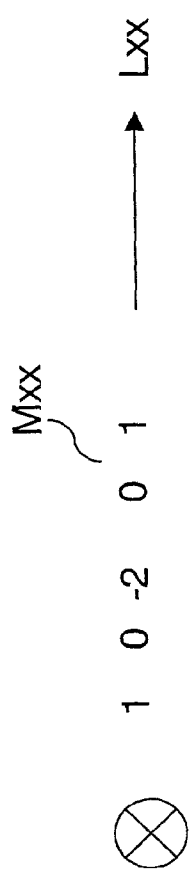
FIGS. 3a to 3d illustrate a technique based on the use of a Hessien matrix for estimating the direction of each pixel of the image.
Figure 3B:
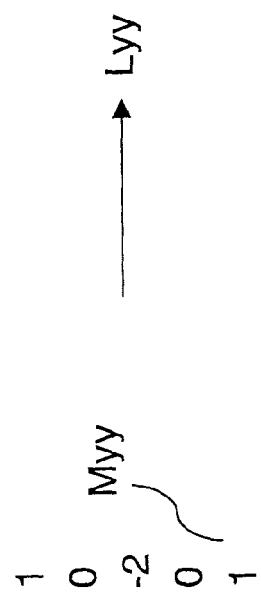
Figure 3C:
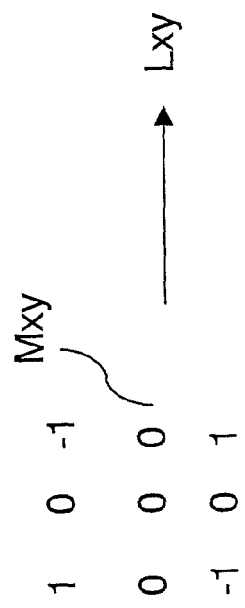
Figure 3D:
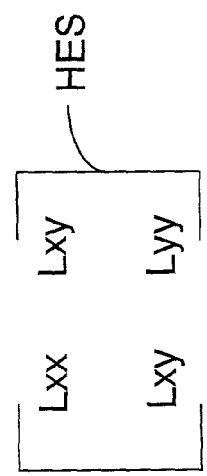

FIGS. 3a to 3d illustrate a technical example of estimating the direction of each image pixel. The method consists of diagonalizing a Hessien matrix HES described with reference to FIG. 3d whose diagonal elements are equal to a first value Lxx and a second value Lyy and the other elements are equal to a value Lxy. A value Lxx, a value Lyy and a value Lxy are computed for each pixel of the digitized image NUMI. FIG. 3a illustrates the computation of the value Lxx. For a given pixel of the digitized image NUMI, one considers a neighborhood N55 of 5 by 5 pixels centered around this pixel and a convolution of this neighborhood N55 with a mask Mxx is effected. The value Lxx is thus obtained. FIG. 3b illustrates the computation of the value Lyy. For the given pixel of the digitized image NUMI, the convolution of the neighborhood N55 with a mask Myy is effected. The value Lyy is thus obtained. FIG. 3c illustrates the computation of the value Lxy. For the given pixel of the digitized image NUMI, the convolution of the neighborhood N55 with a mask Mxy is effected. The value Lxy is thus obtained. Subsequently, the Hessien matrix HES is diagonalized and the eigenvector U associated with the obtained smallest eigenvalue is retained. This vector is the vector of the tangential direction of the pixel under consideration. Subsequently, the direction of this vector is computed, such that the angle obtained is an angle between 0 and 180 degrees. This angle is then divided by 10 and the result obtained is rounded off to the highest integral. An angular sector number K for the pixel under consideration is thus obtained. In this example, there are 18 different angular sector numbers. It is possible to use a different number of angular sector numbers, for example, by dividing the angle of the vector U by 5 instead of by 10.

Figure 4:
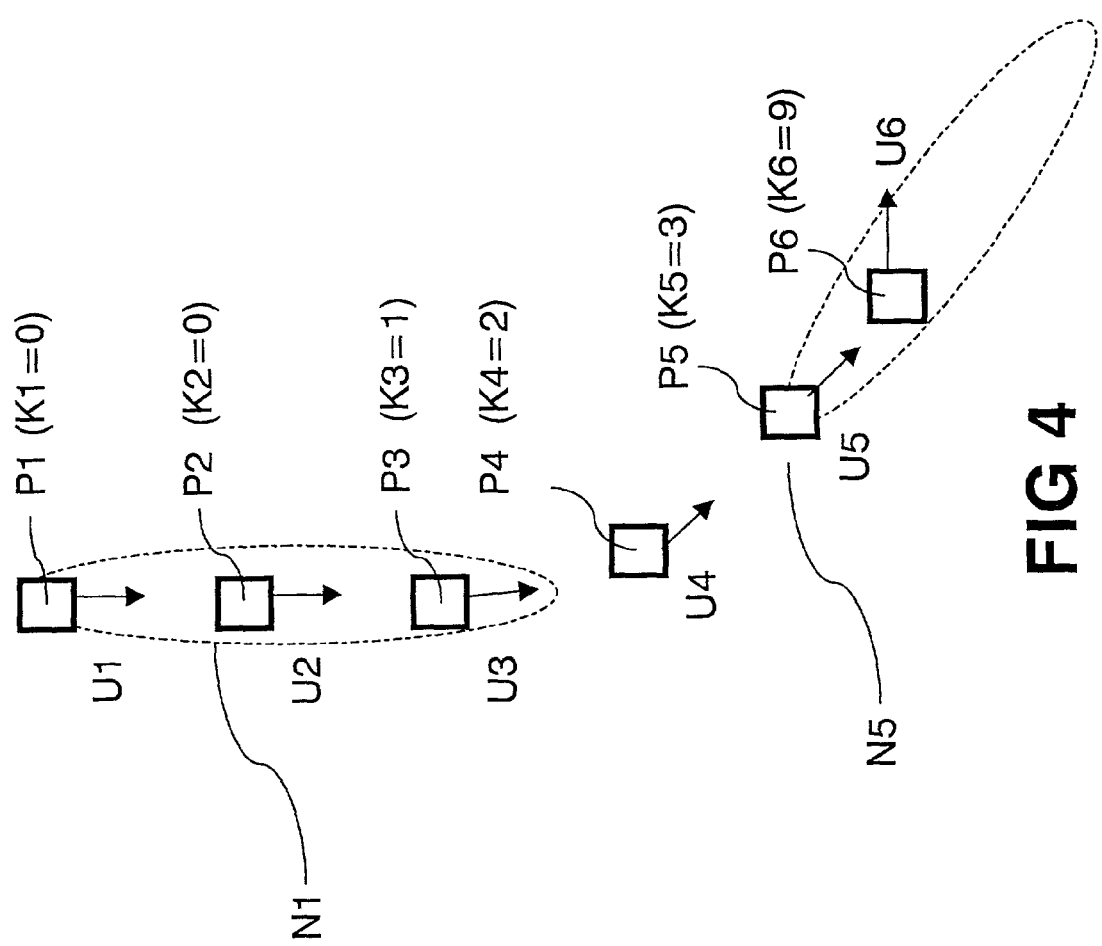
FIG. 4 illustrates an example of the device for analyzing the connectivity of neighboring pixels, based on their directions.

FIG. 4 illustrates an example of the connectivity analysis device 3 based on the direction. The example considered applies to 6 pixels of the direction image DIRI enumerated 1 to 6 (P1, P6) having 6 associated direction vectors enumerated 1 to 6 (U1, U6) and 6 associated angular sector numbers enumerated 1 to 6 (K1, K6). The principle of the connectivity analysis is as follows. For a given pixel PN (where N is an integral number between 1 and 6) a neighborhood NN extending in the direction of the vector UN is considered, over an adjustable length 1. In the present case, two neighborhoods are represented, which are symbolized by dotted line ellipses. The neighborhood N1 is a neighborhood of the pixel P1 extending in the direction of the vector U1. The neighborhood N5 is a neighborhood of the pixel P5 extending in the direction of the vector U5. Let it be assumed that the pixel P1 is the first pixel of the direction image DIRI treated by the connectivity analysis device 3. The value of its angular sector number K1 in the direction image DIRI is, for example, between 0 and 18. The pixel P1 is then labeled with a label 19. All the pixels of the neighborhood N1 having an associated direction vector near U1 will be labeled with the same label 19, in other words, they pertain to the label 19. For example, a vector UN of a pixel PN of the neighborhood N1 may be considered to be near the vector U1 if the angles of these 2 vectors differ by less than 10 degrees, i.e. if the angular sector number KN and the angular sector number K1 maximally differ by one unity. In the example considered, the pixels P2 and P3 pertain to the neighborhood N1. As the angular sector number K2 is equal to the angular sector number K1 and the angular sector number K3 is higher by one unity than the angular sector number K1, the pixels P2 and P3 will also pertain to the label 19. The same operation is performed for neighborhoods of the pixels P2, P3 and P4. It is then easy to ascertain that all pixels P2, P3, P4 and P5 will pertain to the label 19. The pixel P6 has an angular sector number K6 which is 6 unities higher than the angular sector number K5. Consequently, it will pertain to a label which is different from 19, for example, 20. The operation is thus performed in a recursive manner for all the pixels of the direction image DIRI, until all the pixels of the direction image DIRI have been labeled. It will be noted that once a pixel of the direction image DIRI has been labeled, its label can no longer change when the connectivity analysis proceeds. The image CONI constituted by different labels to which the pixels pertain is thus obtained.

The last step of the method consists of selecting groups of pixels in the filtered image RFI in order to preserve the interesting curvilinear structures in this image. The principle of selecting groups of pixels is as follows. The sums µ of the contrasts (in the filtered image RFI) of all the pixels pertaining to the same label in the connected image CONI are computed. This operation is performed for all the labels of the image CONI and the maximum Y of all the computed µ is considered. Only the pixels pertaining to a label are retained, such that µ is higher than the quotient of Y by an adjustable parameter M. The processed image PRCI constituted by pixels of the filtered image RFI, which have been retained after the selection of groups of pixels, is thus obtained. The choice of the parameter M allows different degrees of selection. Indeed, if M is small (in practice, of the order of several unities), fewer groups of pixels of the filtered image RFI will be retained in the processed image PRCI. When M is large (for example, of the order of several hundred in practice) the quasi-totality of the groups of pixels of the filtered image RFI will be retained in the processed image PRCI. It should be noted that the selection of the groups of pixels yields good results for thick curvilinear structures such as a tree structure of blood vessels, because the neighboring pixels pertaining to such a structure generally have the same direction.

FIG. 5a illustrates an image-processing system for carrying out the invention. The image-processing system comprises an image-processing device 5 according to the invention, a workstation 6, a screen 7, a mouse 8 and a keyboard 9.

The digitized image NUMI is processed by the image-processing device 5 in accordance with the method described in the invention. This image-processing device 5 may be implemented as a programmable microprocessor which forms part of the workstation 6 or of a circuit comprising elements such as filters, memories or logic operators for realizing the different steps described in the invention. The screen 7, the mouse 8 and the keyboard 9 allow visualization of the processed images and allow adjustment of the different adjustable parameters described in the invention. The image-processing device may be connected to a storage device for storing the different images obtained during processing.

FIG. 5b illustrates a medical scanning apparatus for carrying out the invention. The apparatus comprises an X-ray source 10, a table 11 to carry a patient 12 to be examined, an optical system 13 and an image-processing system 14.

The optical system 13 allows acquisition of digitized images from X-rays emitted by the X-ray source 10 examining the patient 12. The image-processing system 14 may be, for example, the image-processing system described with reference to FIG. 5a.

Figure 6A:
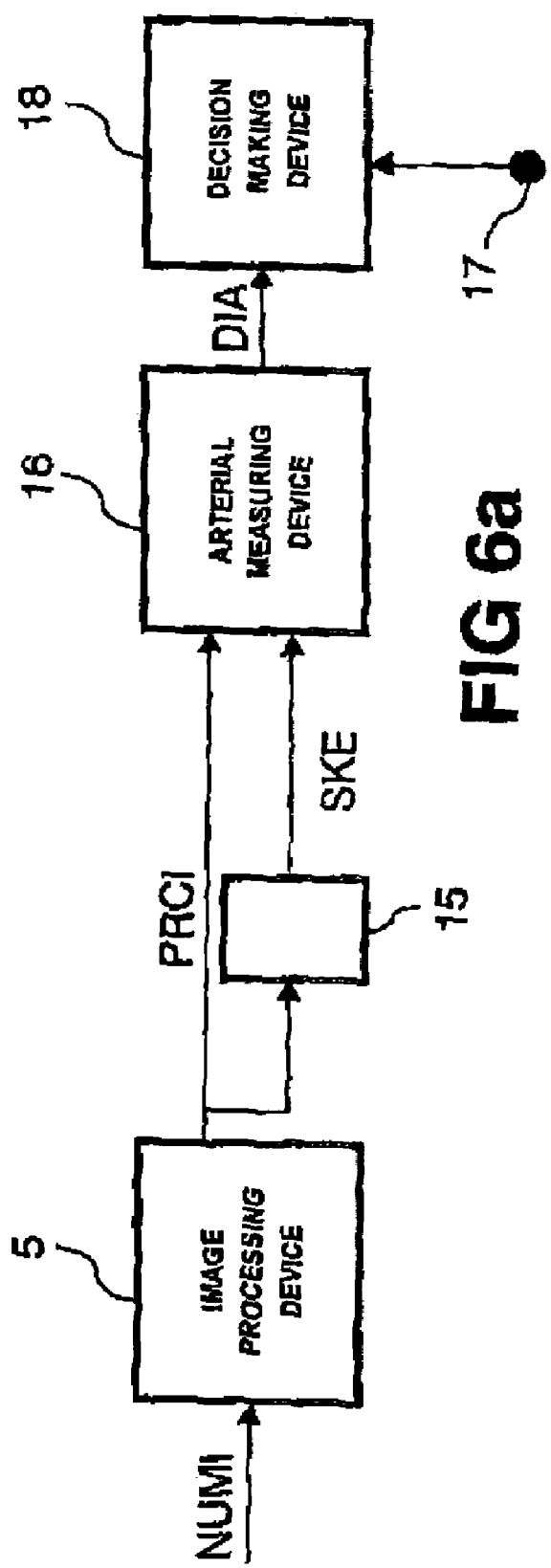
FIG. 6a is a block diagram illustrating a technique of detecting artery anomalies from a digitized image, which is an advantageous embodiment of the invention.

FIG. 6a is a block diagram illustrating a method of processing images, intended for detecting artery anomalies such as, for example, a stenosis or a diffuse coronary disease. Such a method comprises a step of selecting curvilinear structures, realized by the image-processing device 5, a step of skeletonizing, realized by a skeletonizing device 15, a step of measuring artery diameters, realized by a device 16 for measuring artery diameters, and a step of taking decisions, realized by a device 18 for taking decisions on the basis of rules 17 predefined by an operator.

Figure 6B:
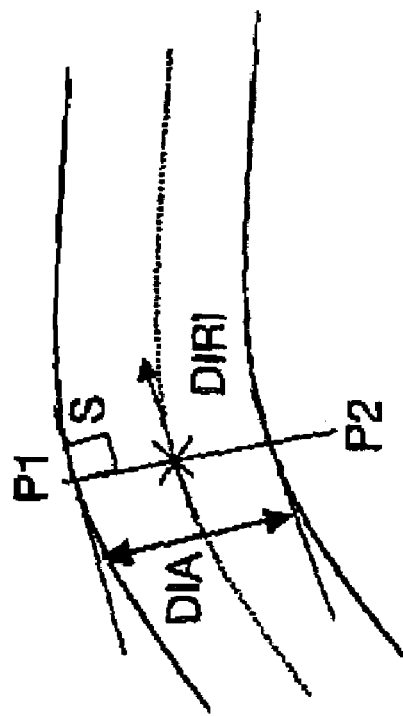
FIG. 6b illustrates an example of computing an artery diameter.

A digitized image NUMI, comprising at least one artery, is processed by the image-processing device 5. The processed image PRCI obtained is subsequently processed by the skeletonizing device 15 in accordance with a method known to those skilled in the art. A skeletonizing operation consists of making an object thinner while preserving its topology, until its width is reduced to one pixel. Such a method is described in, for example, EP 0 840 552, entitled "Procédé de traitement d'images numériques pour l'extraction automatique d'objets en forme de rubans". This method describes steps of extracting median pixels and constructing skeletons of objects by means of tracking. An image SKE of the artery skeleton is supplied. Based on the processed image PRCI, the skeleton SKE and the direction image DIRI, computed by the image-processing device 5, the device 16 for measuring artery diameters computes artery diameters in the following manner, illustrated in FIG. 6b: at each point S of the skeleton SKE, one considers the points of the artery situated on the perpendicular to the direction of the point S going through S, which perpendicular is obtained from the direction image DIRI. On said perpendicular, side points P1 and P2 are considered, which belong to the artery and have at least one directly adjacent neighbor that does not belong to the artery, i.e. having a zero value in the processed image PRCI. The diameter of the artery is evaluated as the distance between the two side points P1 and P2, for example, in accordance with the Euclidian standard. A set of diameters DIA of the artery is thus obtained. The device 18 for taking decisions compares the set of diameters DIA of the artery with rules 17 predefined by an operator and takes a decision on the presence of possible artery anomalies. An image ABM of these possible anomalies is supplied at the output of the device 18 for taking decisions.

Figure 7:
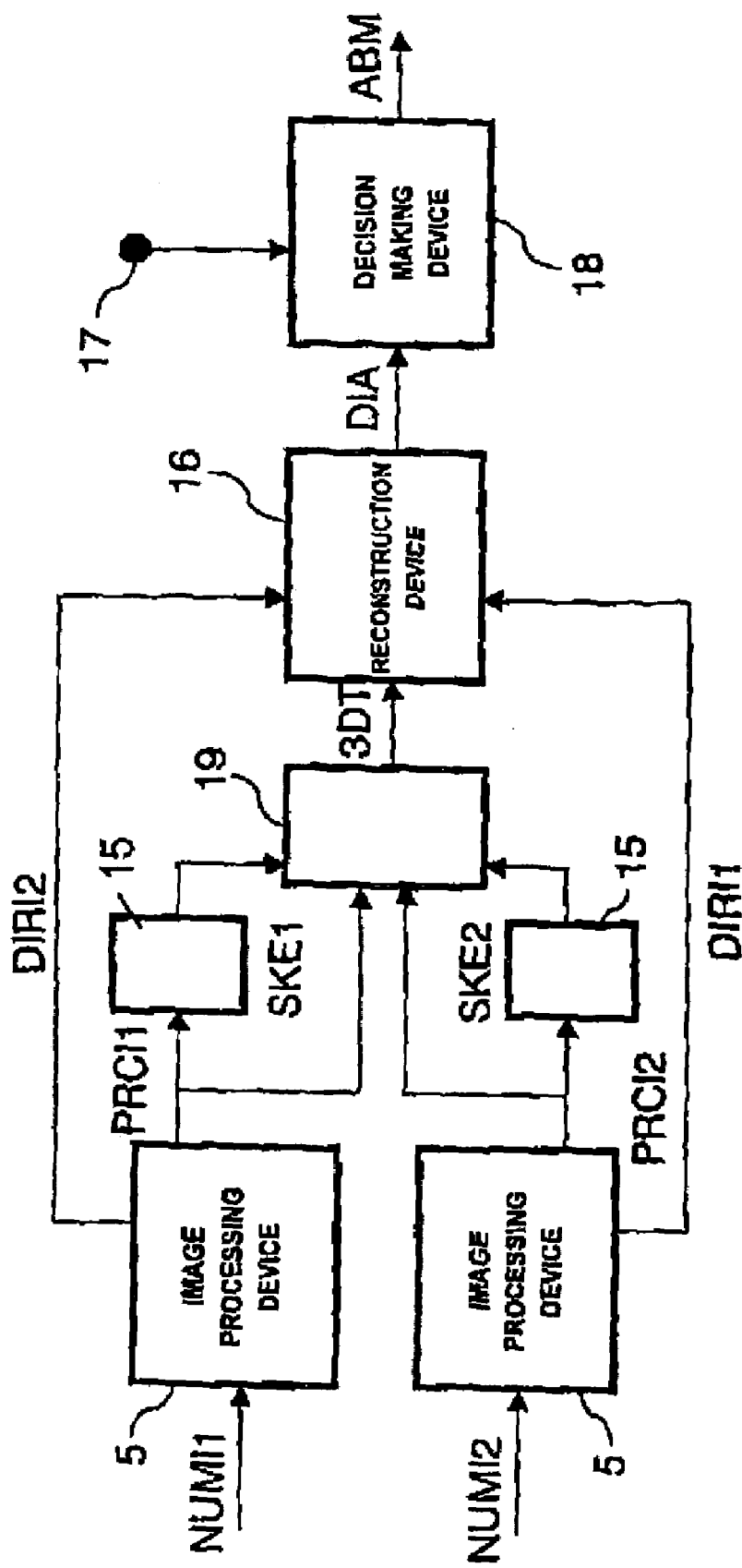
FIG. 7 is a block diagram illustrating a technique of detecting artery anomalies from two different digitized images, intended for carrying out the invention.

FIG. 7 is a block diagram illustrating a method of processing images, intended for detecting artery anomalies in three dimensions (3D). Such a method allows avoidance of artery masking such as reductions or overlaps. It has two different images of the same artery as input and comprises a step of selecting curvilinear structures, realized by the image-processing device 5, a step of skeletonizing, realized by a skeletonizing device 15, a step of reconstructing the 3D image of the artery, realized by a device 19 for reconstructing 3D artery images, a step of measuring artery diameters, realized by the device 16 for measuring artery diameters, and a step of taking decisions, realized by a device 18 for taking decisions on the basis of rules 17 predefined by an operator.

Two different digitized images NUMI1 and NUMI2 of the same artery are first processed individually by the image-processing device 5 in accordance with the method described in the invention. The images PRCI1 and PRCI2 obtained are skeletonized in parallel by the skeletonizing device 15 and lead to the skeletons SKE1 and SKE2, respectively. The images PRCI1 and PRCI2 and their associated skeletons SKE1 and SKE2, respectively, are applied to the input of the device 19 for reconstructing 3D artery images, which forms a 3D image from at least two 2D images. This device supplies a 3D image 3DT of the artery. By way of non-limitative example, such a device may employ the method described in the reference J. Chen, "3D Reconstruction of Coronary Arterial Tree to Optimize Angiographic Visualization", IEEE Transactions on Medical Imaging, Vol. 19, No. 4, April 2000. The device 18 for measuring artery diameters utilizes this 3D image 3DT of the artery together with the tangential direction images DIRI1 and DIRI2, computed by the image-processing device 5, for measuring the set of diameters DIA of the artery. Similarly as in the 2D case, the step 18 of taking decisions detects, on the basis of the set of diameters DIA of the artery and rules 17 predefined by an operator, the possible artery anomalies and supplies an image ABM giving a precise localization of these possible anomalies.

The description above with reference to the Figures illustrates rather than limits the invention. It will be evident that there are numerous alternatives within the scope of the appended claims. In this respect, several remarks will be made below.

There are numerous ways of selecting curvilinear structures in an image. FIG. 2 only illustrates a possible method in which the filter 1 uses two neighborhoods of a pixel, with adjustable dimensions. It is possible to use other filters for selecting curvilinear structures in an image, taking the shape of, for example, masks.

There are numerous ways of estimating the direction in a given image. FIG. 3 only illustrates a possible method in which the estimation of the direction of each pixel depends on the diagonalization of a Hessien matrix. It is possible to use other techniques for estimating the direction of each pixel, for example, by using a discrete channel.

There are numerous ways of effecting a connectivity analysis of neighboring pixels based on their directions in a given image. FIG. 4 only illustrates a possible method in which the connectivity analysis of neighboring pixels based on their directions uses a neighborhood of a pixel extending in the direction of the pixel, in which the width of this neighborhood is adjustable by means of a parameter 1. It is possible to use other techniques for performing the connectivity analysis based on the direction, with different neighborhoods.

The invention claimed is:

1. A method of processing images comprising curvilinear structures, the method comprising the steps of:
   filtering said images;
   selecting pixels within said images pertaining to a curvilinear structure, and
   estimating a direction of each image pixel and analyzing a connectivity of neighboring pixels based on the estimated directions for each said image pixel, and
   selecting groups of image pixels as a function of the result of said analizing.

2. A method of processing images as claimed in claim 1, wherein the step of filtering said images further comprises a step of selecting pixels, the selected pixels displaying a contrast which is larger than X times a variance of the noise in the image, where X is a user-adjustable parameter.

3. A method of processing images as claimed in claim 1, wherein said step of filtering said images uses two neighborhoods (N1) and (N2), of a given pixel, wherein a gap (GAP) extending between these neighborhoods is user-adjustable.

4. A method of processing images as claimed in claim 3, wherein a height (H) and a length (L) of said neighborhoods are adjustable.

5. A method of processing images as claimed in claim 1, wherein said step of analyzing the connectivity of neighboring pixels uses a neighborhood of a given pixel, which neighborhood extends in the direction of the pixel considered and, determined during the step of estimating.

6. A method of processing images as claimed in claim 5, wherein the length of said neighborhood is adjustable.

7. A method of processing images as claimed in claim 1, wherein the step of selecting groups of pixels uses an adjustable parameter M, which parameter M allows computation of a minimal sum of contrasts of the pixels of a given group required for the group to be selected.

8. A method of processing images as claimed in claim 1, further including:
   skeletonizing said images to extract a skeleton of curvilinear structures,
   measuring diameters of arteries found in said skeletonized images, detecting arterial anomalies on the basis of the basis of the diameters and predefined rules.

9. A computer readable medium comprising a set of computer readable instructions; which computer readable instruction may be processed by a computer to implement a method of processing images as claimed in claim 1.

10. An image-processing system comprising a programable computer programmed with a set of instructions for carrying out the method as set forth in claim 1, including a device for projecting images processed thereby, and a device for storing said images.

11. A method of processing images, comprising the steps of:

acquiring at least a first digitized image and a second digitized image of an artery to be analyzed for artery anomalies, filtering said first and second digitized images;

selecting pixels within said filtered, digitized images pertaining to a curvilinear structure, and estimating a direction of each selected pixel and analyzing a connectivity of neighboring pixels based on the estimated direction for each selected pixel, and selecting groups of pixels as a function of the result of said analyzing, skeletonizing the first and the second processed images to extract a first skeleton of the curvilinear structure of the first processed image, and a second skeleton of the curvilinear structure of the second processed image, reconstructing a 3D image of the artery, based on the first snd the second processed image and skeletons, measuring artery diameters, within the reconstructed 3D image of the artery, and determining the existence of artery anomalies based on said diameters and rules.

\* \* \* \* \*